United States Patent Office 3,590,052
Patented June 29, 1971

3,590,052
PHOSPHORYLATED DIHYDROBENZOTHIO-
PHENES AND THIACHROMANS
Michael D. Barker, Maidstone, Kent, England, assignor
to Shell Oil Company, New York, N.Y.
No Drawing. Filed Mar. 12, 1969, Ser. No. 806,720
Claims priority, application Great Britain, Mar. 28, 1968,
14,970/68
Int. Cl. A01n 9/36; C07d 63/22, 65/14
U.S. Cl. 260—327          6 Claims

ABSTRACT OF THE DISCLOSURE

Phosphorylated dihydrobenzothiophenes and thiachromans of the formula

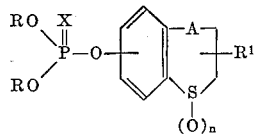

wherein X is oxygen or sulfur, A is a covalent bond or methylene, each R is individually an alkyl group, $R^1$ is hydrogen or an alkyl group and $n$ is 0 or 1, are useful as insecticides.

SUMMARY OF THE INVENTION

This invention relates to novel phosphorylated benzothiophene and thiachroman derivatives, processes for their preparation and compositions containing them. The compositions show interesting biological activity, possessing useful insecticidal activity.

Accordingly, the present invention provides as novel compounds, phosphorylated dihydrobenzothiophene and thiachroman derivatives of the general formula

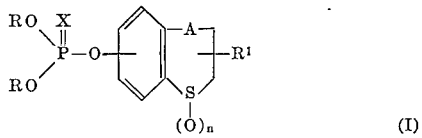  (I)

wherein X represents an oxygen or sulfur atom; A represents a covalent bond or a methylene group; each R individually represents an alkyl group; $R^1$ represents a hydrogen atom or alkyl group; and $n$ represents 0 to 1.

Preferred compounds are those wherein each group R represents an alkyl group or 1–6 carbon atoms, especially a methyl or ethyl group; and $R^1$ represents a hydrogen atom or an alkyl group of 1–6 carbon atoms, especially a methyl group.

The preparation of the compounds of Formula I is conveniently carried out by reacting a phenol of formula

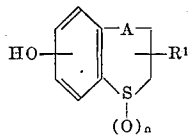  (II)

with a suitable phosphorus halide of formula

  (III)

In these formulae X, A, R, $R^1$ and $n$ have the meanings defined above in relation to Formula I, and Hal represents a halogen atom, preferably a chlorine atom. The phenol of Formula II is preferably reacted in the form of an alkali metal salt, suitably potassium, whilst it is generally desirable for the reaction to be carried out in an organic solvent, methyl isobutyl ketone being especially suitable.

The phenolic starting material of Formula II can be synthesized in a number of ways, but when A represents a covalent bond and $n=0$ a convenient route is to reduce the corresponding alkoxy-substituted benzothiophene of formula

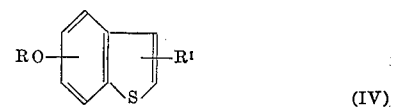  (IV)

suitably with sodium in ethanol, to yield the corresponding 2,3-dihydrobenzothiophene of formula

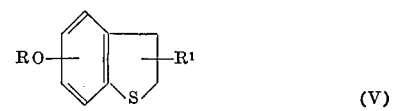  (V)

and subsequently to dealkylate this product, preferably by successive treatments with boron tribromide and water. The route used to prepare the alkoxy-substituted benzothiophene derivative of Formula IV will generally vary according to the nature of the $R^1$ substituent, but any one of the standard methods known for synthesizing rings of this type may be employed. Representative examples of the different types of route are given in the specific examples later in this specification.

When the phenol of Formula II is one wherein $n$ represents 1, it is most conveniently prepared by oxidizing an alkoxy-2,3-dihydrobenzothiophene of Formula V with the stoichiometric amount of oxidizing agent, preferably hydrogen peroxide in glacial acetic acid, and subsequently dealkylating the resultant alkoxy-2,3-dihydrobenzothiophene 1-oxide as described above.

As indicated earlier, the phosphorylated dihydrobenzothiophenes and thiachromans of this invention are biologically active, showing in particular insecticidal activity. Accordingly the invention includes in its scope biocidal compositions comprising at least one phosphorylated dihydrobenzothiophene or thiachroman of the invention in association with a carrier or a surface-active agent, or both a carrier and a surface-active agent. Likewise the invention includes also a method of combating insects, which comprises applying to the insects, or to their habitat, a biocidally effective amount of a compound of the invention, or a biocidal composition containing such a compound.

The invention includes also a method of improving the yield of crops at a given site which comprises applying to the site a biocidally effective amount of a phosphorylated dihydrobenzothiophene or thiachroman of the invention, or a biocidal composition containing such a compound.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating pesticides may be used as carrier.

Examples of suitable solid carriers are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example superphosphates.

Examples of suitable fluid carriers are water, alcohols, such as for example, isopropanol, ketones such as for example, acetone methyl ethyl ketone, methyl isobutyl ketone and cyclohexanone, ethers, aromatic hydrocarbons such as for example, benzene and toluene, petroleum fractions such as for example, kerosine, chlorinated hydrocarbons, such as for example, carbon tetrachloride, including liquefied normally vaporous gaseous compounds. Mixtures of different liquids are often suitable.

The surface-active agent may be a wetting agent, an emulsifying agent or a dispersing agent; it may be non-ionic or ionic. Any of the surface-active agents usually applied in formulating herbicides or insecticides may be used. Examples of suitable surface-active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example p-octylphenol or p-octylcresol, with ethylene oxide and/or propylene oxide; sulfates or sulfonates of these condensation products; and alkali metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50 or 75% of toxicant and usually contain, in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% of toxicant. Granules are usually prepared to have a size between 10 and 100 BS mesh, and may be manufactured by agglomeration or impregnation techniques. Generally, granules will contain ½–25% toxicant and 0–25% of additives such as stabilizers, slow release modifiers, binding agents, etc. Emulsifiable concentrates usually contain, in addition to the solvent and, when necessary, co-solvent, 10–50% w./v. toxicant, 2–20% w./v. emulsifiers and 0–20% of appropriate additives such as stabilizers, penetrants and corrosion inhibitors. Pastes are compounded so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example, protective colloids such as gelatin, glue, casein, gums and polyvinyl alcohol; sodium polyphosphates; cellulose ethers, stabilizers such as ethylene diamine tetra-acetic acid; other herbicides or pesticides; and stickers, for example non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The novel compounds, the processes for their preparation, and the biocidal activity of these compounds are further illustrated in the following examples, in which all temperatures are given in degrees centigrade, and the structures of the various compounds synthesized are deduced from their methods of synthesis and confirmed by NMR and IR spectra.

EXAMPLE I

Preparation of 2,3-dihydro-benzo(b)thien-5-yl phosphorothionic acid, dimethyl ester

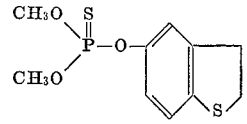

5-hydroxybenzo(b)thiophene (6 g.) was dissolved in 3 N sodium hydroxide (13 ml.). Methyl p-toluenesulfonate (7.45 g.) was added, and the mixture heated with stirring for 1 hour on a boiling water bath, 6 N sodium hydroxide (2 ml.) was added, the mixture heated for a further ½ hour, and then cooled and extracted with ether. Drying and evaporation of the ether extract yielded an oil which crystallized to a solid. This solid was taken up in petrol (60–80°), a small amount of insoluble material filtered off, and the filtrate purified chromatographically on a silica gel column using 5% benzene/petrol (60–80°) as eluent to yield 5-methoxy-benzo(b)thiophene.

5-methoxy benzo(b)thiophene (6.2 g.) was dissolved in super-dry ethanol (200 ml.) under nitrogen with stirring. Sodium was then added in 1–2 g. portions until a total of 12 g. had been added, the temperature being maintained at 35–40° first by cooling, then by warming. When all the sodium had dissolved a further 4 g. sodium was added and the mixture vigorously stirred overnight. The residual sodium was then dissolved by the careful addition of water, after which 1 liter of water was added. The whole mixture was then steam distilled and 3 l. collected. This distillate was extracted with ether, and the ether extract dried and evaporated to yield an oil. This oil was then dissolved in 10% benzene/petrol (60–80°) and chromatographically purified on a silica gel column to yield 5-methoxy-2,3-dihydrobenzo(b)thiophene.

5-methoxy-2,3-dihydrobenzo(b)thiophene (1.75 g.) was then dissolved in dry carbon tetrachloride (30 ml.) and boron tribromide (2 ml.) added. After standing for 3 hours at room temperature the mixture was poured onto ice and extracted with ether to yield crude 5-hydroxy-2,3-dihydrobenzo(b)thiopene. This phenol was then converted to its potassium salt and reacted with dimethyl phosphorochloridothionate in methyl isobutyl ketone. After completion of the reaction the mixture was cooled and filtered, and the filtrate evaporated to yield an oil. This oil was then purified chromatographically on a silica gel column to yield 2,3-dihydrobenzo(b)thien-5-yl phosphorothionic acid, dimethyl ester.

*Analysis.*—Calculated for $C_{10}H_{13}PS_2O_3$ (percent): C, 43.4; H, 4.7; P, 11.2. Found (percent): C, 45.5; H, 5.0; P, 10.7.

EXAMPLE II

Preparation of 2,3-dihydro-3-methylbenzo(b)thien-5-yl phosphorothionic acid, dimethyl ester

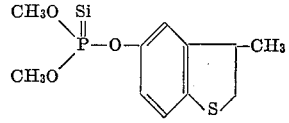

p-Methoxythiophenol (35 g.) was dissolved in acetone (100 ml.), potassium carbonate (34.5 g.) was added, and then chloracetone (23.1 g.) dissolved in acetone (100 ml.) was added in portions with stirring. The reaction mixture was then refluxed overnight, cooled, and poured into dilute HCl. The aqueous solution was then extracted with benzene, and the benzene extract washed successively with water, 2 N sodium hydroxide and water. The solution was then dried, the solvent evaporated off, and the residue distilled at 115–124°/0.2 mm. to yield 4-methoxyphenylthioacetone.

4-methoxyphenylthioacetone (16 g.) was dissolved in dry chlorobenzene (200 ml.), and added dropwise to a mixture of phosphorus pentoxide (50 g.) and phosphoric acid (100 ml.). The mixture was then heated under reflux for 2 hours, cooled, and poured into water. The chlorobenzene layer which separated was then extracted three times with benzene to yield 5-methoxy-3-methylbenzo(b) thiophene.

The 5-methoxy-3-methyl-benzo(b)thiophene (6.3 g.) was dissolved in super-dry ethanol (200 ml.) under nitrogen and reduced by the addition of pieces of sodium metal (20 g., 1–2 g. portions) and overnight stirring. The residual sodium was dissolved by adding ethanol and the resultant product was then poured into water, the ethanol distilled off through a fractionating column until the distillate was at 80°, when the residue was steam distilled. The distillate was extracted with ether and purified to yield a product which was 2,3-dihydro-5-methoxy-3-methyl-benzo(b)thiophene.

This product was then dissolved in dry carbon tetrachloride (20 ml.) and boron tribromide (2 g.) added. After standing overnight at room temperature the reaction mixture was then heated to 50° for three hours. The resultant mixture was then poured into ice-water, the carbon tetrachloride layer separated and the remainder extracted three times with ether. The combined organic layers were then dried and evaporated to yield a residue which was chromatographically purified to yield 2,3-dihydro-5-hydroxy-3-methyl-benzo(b)thiophene. This product was then converted to its potassium salt, which was dried and dissolved in methyl isobutyl ketone and dimethyl-phosphorochloridothioate (1.8 g.) was added. The solution was stirred at room temperature overnight, then at 80° for three hours. After being cooled and filtered, the filtrate was evaporated and the residual oil chromatographically purified to yield the desired product, whose structure was confirmed by NMR spectra.

Analysis.—Calculated for $C_{11}R_{15}PS_2O_3$ (percent): C, 45.5; H, 5.2; P, 10.7. Found (percent): C, 47.3; H, 5.3; P, 10.7.

EXAMPLE III

Preparation of thiachroman-6-yl phosphorothionic acid, dimethyl ester (A), and 2,3-dihydro-2-methyl-benzo(b)-thien-5-yl phosphorothionic acid, dimethyl ester (B)

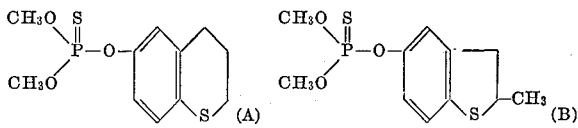

p-Methoxythiophenol (21 g.) was dissolved in absolute ethanol, sodium (3.45 g.) was added, and the solution stirred during the dropwise addition of allylbromide (21 g.). The reaction mixture was stirred overnight at room temperature, the ethanol was distilled off, water was added and the mixture then extracted with ether. Drying and evaporation of the extract then yielded p-methoxyphenylallyl sulfide.

Approximately 100 mls. of quinoline was heated to boiling, p-methoxyphenylallyl sulfide (8 g.) dissolved in quinoline (10 ml.) was added dropwise and the reaction mixture refluxed for 3 hours. About two-thirds by volume of the reaction mixture was then distilled off, ether was added to the residue and the resulting solution extracted twice with 2 N hydrochloric acid. The combined acid extracts were then extracted twice with ether, and the combined ether extracts dried and evaporated to yield an oil which was separated by GLC into two products: (a) 5 - methoxy-2-methyl-2,3-dihydrobenzo(b)-thiophene, and (b) 6-methoxythiachroman.

Each of these two products was then separately demethylated by reaction with boron tribromide in chloroform, followed by pouring onto ice, and the resulting hydroxy compound then converted to the potassium salt and phosphorylated by reaction with dimethylphosphorochloridothionate in methyl isobutyl ketone. In this way there were obtained the two desired products, each as a yellow oil whose structure was confirmed by NMR.

Analysis for (A).—Calculated for $C_{11}H_{15}PS_2O_3$ (percent): C, 45.5; H, 5.2; P, 10.7. Found (percent): C, 47.3; H, 5.4; P, 10.4.

Analysis for (B).—Calculated for $C_{11}H_{15}PS_2O_3$ (percent): C, 45.5; H, 5.2; P, 10.7. Found (percent): C, 46.0; H, 5.5; P, 10.6.

EXAMPLE IV

Preparation of 2,3-dihydro-1-oxo-benzo(b)thien-5-yl phosphorothionic acid, dimethyl ester

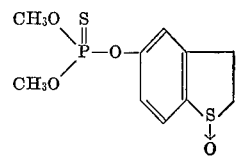

5-methoxy-2,3-dihydrobenzo(b)thiophene (0.8 g.) was dissolved in glacial acetic acid (3 ml.) and the solution cooled in ice-water with stirring. 30% hydrogen peroxide (0.55 ml.) was added dropwise, and after being stirred for a further quarter of an hour the cooling was removed and the mixture then stirred for a further two hours at ambient temperature. The mixture was then diluted with water (20 ml.) and evaporated to a small volume under reduced pressure; this procedure being repeated twice. The residue was then taken up in chloroform and the resultant solution washed once with sodium carbonate solution. Drying and evaporation of the chloroform solution then yielded crude 5-methoxy-2,3-dihydro-benzo(b)thiophene-1-oxide.

This product was then dissolved in dry carbon tetrachloride (15 mls.) and boron tribromide (1 ml.) added. After standing at ambient temperature for 3 hours, the mixture was poured onto ice-water and extracted with ether. Drying and evaporation of the ether solution then yielded crude 5-hydroxy-2,3-dihydrobenzo(b)thiophene-1-oxide.

This phenol was then converted to its potassium salt, which was dried and suspended in dry methyl isobutyl ketone. An excess of dimethyl-phosphorochloridothionate (1 g.) was added and the mixture stirred at 80° for 6 hours. After cooling the product was filtered and the filtrate evaporated to yield an oil which was chromatographically purified on a silica gel column using methylene dichloride/carbon tetrachloride (1:3) as eluent to yield the desired product as an oil whose structure was confirmed by NMR and IR spectra.

Analysis.—Calculated for $C_{10}H_{13}PS_2O_4$ (percent): C, 41.1; H, 4.5. Found (percent): C, 42.4; H, 4.8.

EXAMPLE V

Preparation of 2,3-dihydro-3-methyl-benzo(b)thien-5-yl phosphoric acid, diethyl ester

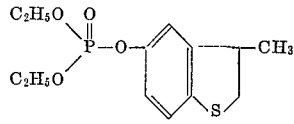

2,3-dihydro-5-hydroxy - 3- methyl - benzo(b)thiophene prepared as in Example II was converted to its potassium salt. The dried potassium salt (0.65 g.) was suspended in dry methyl isobutyl ketone and diethylphosphorochloridate (0.69 g.) was added. The mixture was stirred at room temperature for 5 hours and then maintained at 60° for 6 hours. The mixture was filtered and the solvent evaporated off. The residue was chromatographed on silica gel and on eluting with dichloromethane the desired product was obtained as an oil whose structure was confirmed by NMR and IR spectra.

Analysis.—Calculated for $C_{13}H_{19}PSO_4$ (percent): C, 51.6; H, 6.3. Found (percent): C, 51.7; H, 6.9.

EXAMPLE VI

Insecticidal activity

The insecticidal activity of the compounds obtained in the previous examples was tested as follows:

(I) A 0.1% by weight solution in acetone of the compound to be tested was prepared, and taken up in a micrometer syringe. Two to three-day old adult female house flies (*Musca domestica*) were anesthetized with carbon dioxide, and 1 μl. drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(II) A quantity of 0.1 ml. of a 0.1% by weight solution of the compound to be tested in acetone was mixed in a beaker with 100 ml. of water. Twenty 5–6 day-old (4th instar) mosquito larvae (*Aedes aegypti*) were added and the beakers stored for 24 hours. The percentage of dead and moribund larvae was then recorded.

(III) The compounds were formulated as solutions or suspensions in water containing 20% by weight of acetone and 0.05% by weight of Triton X 100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 40 gallons per acre, the plants passing under the spray on a moving belt. The 4th instar (8-day-old) diamond-back moth larvae (*Plutella maculipennis*), ten apterous (6-day-old) vetch aphids (*Megoura viciae*), and ten adult 1–2 week-old mustard beetles (*Phaedon cochleariae*) respectively were placed on the sprayed leaves and each plant then enclosed in a glass cylinder fitted at one end with a muslin cap. Mortality counts were made after 24 hours.

(IV) In tests against glass house red spider mites (*Tetranychus telarius*), leaf discs cut from French bean plants were sprayed in the manner described under III. 1 hour after spraying, the discs were inoculated with 10 adult mites. Mortality counts were made 24 hours after inoculation.

(V) In tests against large white butterfly larvae (*Pieris brassicae*), cabbage leaves were sprayed in the manner described under III. 10 3rd instar (8–10 day-old) larvae were placed on discs cut from the sprayed leaves within petri-dish pairs. Mortality counts were made 24 hours after inoculation.

The results of these tests are set out in Table 1 below, where A denotes complete kill of the test insect, B some kill and C no kill.

TABLE 1

| Compound | Insecticidal activity | | | | | | |
|---|---|---|---|---|---|---|---|
| | M.d. | A.a. | P.c. | P.m. | P.b. | M.v. | T.t. |
| 2,3-dihydro-benzo(b)thien-5-yl phosphorothionic acid, dimethyl ester. | A | A | A | A | A | A | A |
| Thiachroman-6-yl phosphorothionic acid, dimethyl ester. | A | A | A | B | C | A | A |
| 2,3-dihydro-2-methyl-benzo(b)thien-5-yl phosphorothionic acid, dimethyl ester. | A | A | A | A | A | A | A |
| 2,3-dihydro-3-methyl-benzo(b)thien-5-yl phosphorothionic acid, dimethyl ester. | A | A | A | A | A | A | A |
| 2,3-dihydro-1-oxo-benzo(b)thien-5-yl phosphorothionic acid, dimethyl ester. | A | A | A | B | C | A | A |
| 2,3-dihydro-3-methyl-benzo(b)thien-5-yl phosphoric acid, diethyl ester. | A | A | A | A | A | A | A |

I claim as my invention:

1. A compound of the formula

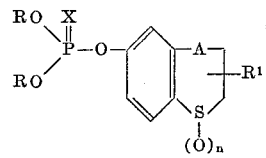

wherein X is sulfur or oxygen; A is a covalent bond or methylene, each R is individually an alkyl group of from 1 to 6 carbon atoms, $R^1$ is hydrogen or an alkyl group of 1 to 6 carbon atoms and n is 0 or 1.

2. A compound according to claim 1 wherein A is a covalent bond, R is methyl or ethyl and $R^1$ is hydrogen or methyl.

3. A compound according to claim 2, wherein X is sulfur.

4. A compound according to claim 3 wherein R is methyl, $R^1$ is hydrogen and n is 0.

5. A compound according to claim 3 wherein R is methyl, $R^1$ is hydrogen and n is 1.

6. A compound according to claim 3 wherein R is methyl, $R^1$ is methyl and n is 0.

References Cited

UNITED STATES PATENTS 3,428,655  2/1969  Melton, et al. _____ 260—330.5

HENRY R. JILES, Primary Examiner

C. M. SHURKO, Assistant Examiner

U.S. Cl. X.R.

260—330.5; 424—202